(12) United States Patent
Morroney

(10) Patent No.: US 6,193,291 B1
(45) Date of Patent: Feb. 27, 2001

(54) VACUUM CUP APPARATUS

(75) Inventor: Wayne Morroney, Troy, MI (US)

(73) Assignee: ISI Norgren, Inc., Clinton Township, MI (US)

( * ) Notice: Subject to any disclaimer, the term of this patent is extended or adjusted under 35 U.S.C. 154(b) by 0 days.

(21) Appl. No.: 09/419,258

(22) Filed: Oct. 15, 1999

Related U.S. Application Data

(60) Provisional application No. 60/144,677, filed on Jul. 20, 1999.

(51) Int. Cl.$^7$ ........................................................ B25J 15/06
(52) U.S. Cl. ................................................................ 294/64.1
(58) Field of Search ................................ 294/64.1, 64.2, 294/64.3; 901/40; 269/21; 29/743

(56) References Cited

U.S. PATENT DOCUMENTS

| | | | |
|---|---|---|---|
| 1,251,258 | * 12/1917 | Magill | 294/64.1 |
| 2,523,157 | * 9/1950 | Somma | 294/64.1 |
| 3,195,941 | * 7/1965 | Morey | 294/64.1 |
| 3,602,543 | * 8/1971 | Sjodin | 294/64.1 |

FOREIGN PATENT DOCUMENTS

| | | | |
|---|---|---|---|
| 1473119 | * 3/1967 | (FR) | 294/64.1 |
| 2547289 | * 12/1984 | (FR) | 294/64.1 |
| 53-142756 | * 12/1978 | (JP) | 294/64.1 |

* cited by examiner

Primary Examiner—Dean J. Kramer
(74) Attorney, Agent, or Firm—Young & Basile, P.C.

(57) ABSTRACT

A vacuum cup apparatus having a flexible member with a front side engagable with a workpiece and a back side connectable to a manipulator and communicable with a vacuum source. A passageway is provided between the front side and the back side of the flexible member and is communicable with the vacuum source to provide vacuum to the front side of the flexible member. A recessed pocket formed in the front side of the flexible member provides a lip which defines an opening into the recessed pocket. The lip is engagable with the workpiece for maintaining atmospheric pressure within the recessed pocket when the vacuum cup apparatus is engaged with the workpiece. The establishment of atmospheric pressure within the recessed pocket reduces vacuum provided in the center portion of the front side of the flexible member to reduce or eliminate any tin cupping of the workpiece.

21 Claims, 2 Drawing Sheets

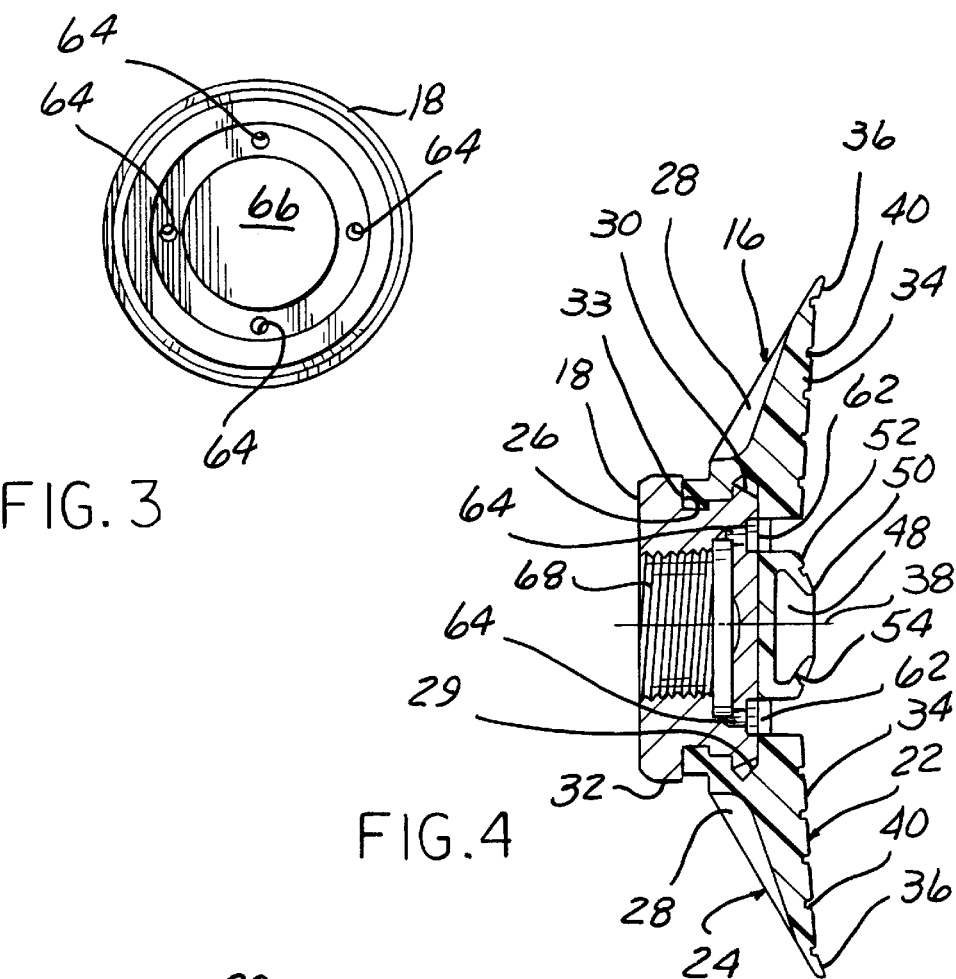
FIG. 3
FIG. 4
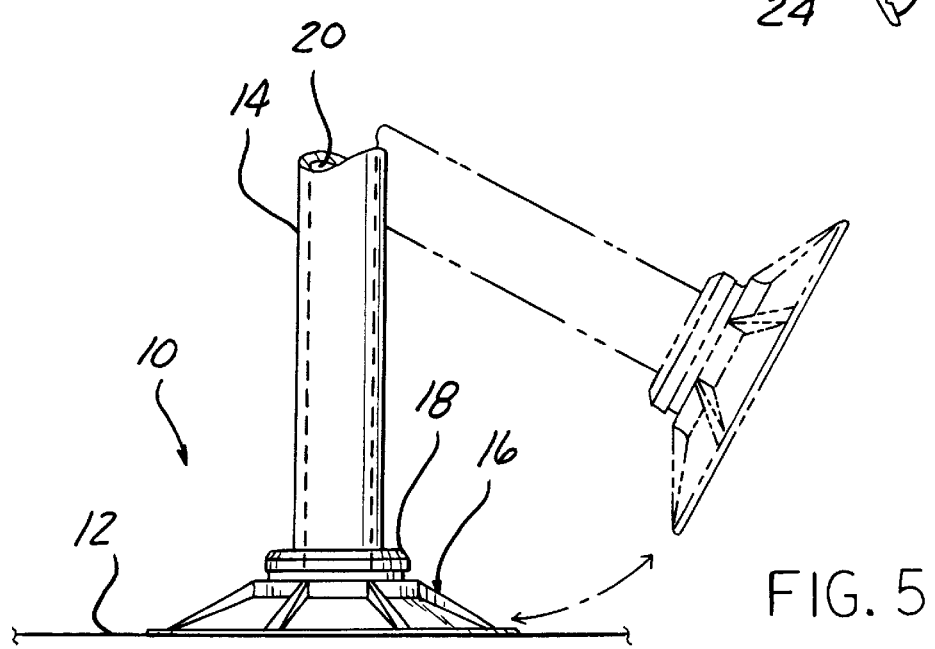
FIG. 5

VACUUM CUP APPARATUS

This application claims the benefit of U.S. Provisional Application No. 60/144,677 filed on Jul. 20, 1999.

FIELD OF THE INVENTION

The present invention relates to a vacuum cup apparatus utilized to lift and manipulate a workpiece, and in particular, a vacuum cup apparatus which utilizes vacuum to retain and handle flat workpieces, such as sheet metal pieces and the like.

BACKGROUND OF THE INVENTION

Various designs of vacuum cups have been utilized to retain and secure a workpiece by applying negative air pressure or vacuum between the vacuum cup and the workpiece. Typically, the vacuum cup is secured to a manipulator or transfer boom which moves the vacuum cup thereby imparting motion to a vacuum cup engaged workpiece. The use of the vacuum cup allows the workpiece to be picked up and transferred while avoiding the use of any type of mechanical components directly contacting the workpiece. Such mechanical components can impose harmful forces on the workpiece thereby resulting in flawing or damaging the workpiece and surfaces thereof.

When the workpiece consists of thin sheet metal, certain vacuum cup designs may impart too much vacuum on the sheet metal workpiece thereby causing a phenomenon called "tin cupping". Tin cupping occurs when a portion of the sheet metal workpiece deforms or "bubbles up" from the force of the vacuum created by the vacuum cup. Such tin cupping may create flaws or deformations in the surface of the sheet metal which are undesirable.

In addition, such sheet metal workpieces may collect oils and residues on the surface of the sheet metal which are typical of the machining and industrial environments in which they are created. Such oils and residues can create a hydroplaning effect between the vacuum cup and the workpiece thereby affecting the retention of the workpiece by the vacuum cup.

Thus, it is desirable to produce a vacuum cup apparatus that avoids the tin cupping phenomena associated with most sheet metal workpieces. In addition, it is also desirable to create a vacuum cup apparatus that displaces any oils or residues which may be found on the sheet metal workpiece and that may affect the retention of the sheet metal workpiece by the vacuum cup apparatus.

SUMMARY OF THE INVENTION

The present invention provides a vacuum cup apparatus having a flexible member with a front side that is engagable with a workpiece and a back side that is connectable to a manipulator. A passageway is provided between the front side and the back side of the flexible member and is communicable with a vacuum source which provides vacuum to the front side of the flexible member. A recessed pocket formed in the front side of the flexible member provides a lip which defines an opening into the recess pocket. The lip is engagable with the workpiece for maintaining atmospheric pressure within the recessed pocket when the vacuum cup apparatus is engaged with the workpiece.

The front side of the flexible member has a substantially flat surface with an outer perimeter portion that extends outwardly from and integrally with the flat surface. The flat surface has a plurality of grooves and slots formed therein for directing away any oils and residues which may be found between the surface of the workpiece and the flat surface of the flexible member. The back side of the flexible member may provide a plurality of integral ribs for providing additional structural support to the flexible member.

The back side of the flexible member provides a recess for receiving a rigid coupling member and for providing a sealed engagement between the rigid coupling member and the flexible member. The coupling member provides a plurality of apertures which are in communication with the passageway that extends between the front side and the back side of the flexible member. The plurality of apertures in the coupling member are in communication with a central aperture in the coupling member to create a path in communication with the passageway. The central aperture is engagable with a manipulator and communicable with a vacuum source.

BRIEF DESCRIPTION OF THE DRAWINGS

The various other uses of the present invention will become more apparent by referring to the following detailed descriptions and drawings in which:

FIG. 3 is a front plan view of the rigid coupling member;

FIG. 4 is a cross section of the vacuum cup apparatus as viewed in the direction of arrows 4—4 in FIG. 2; and FIG. 5 is a front plan view showing the vacuum cup apparatus engaging a workpiece and connected to a manipulator.

DESCRIPTION OF THE PREFERRED EMBODIMENTS

Figure 1:
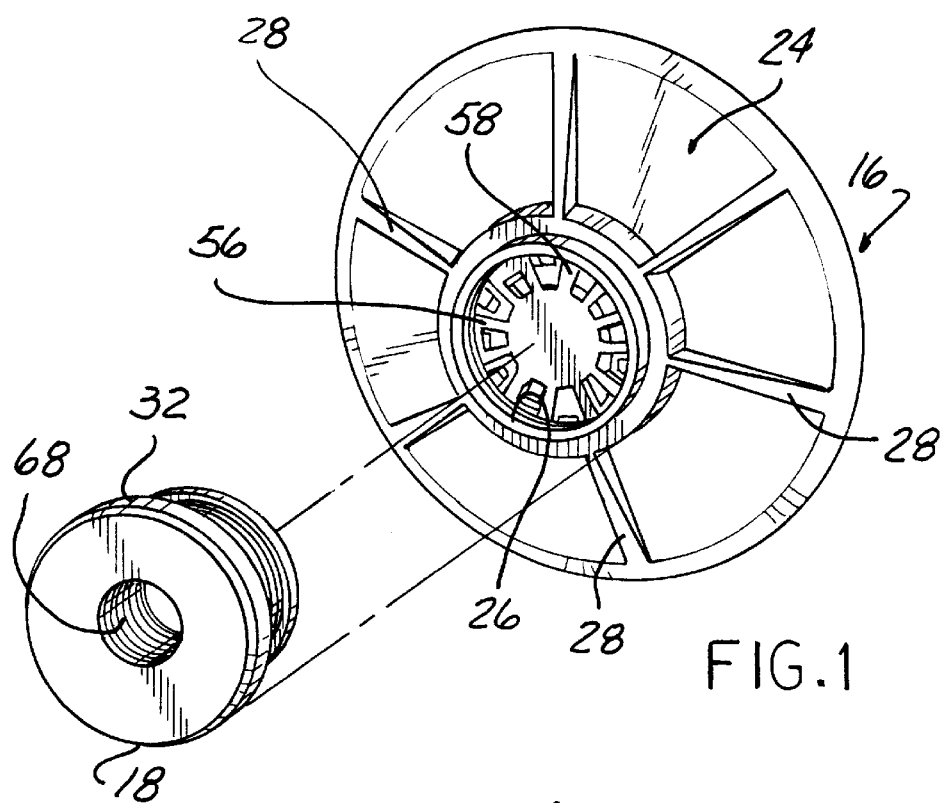
FIG. 1 is an exploded view showing the rigid coupling member and the back side of the flexible member of the present invention.

FIGS. 5 shows a vacuum cup apparatus 10 as defined by the present invention. Although the present invention may be utilized in conjunction with a variety of workpieces, the present invention is best suited with substantially flat workpieces 12, such as sheet metal. In addition, a variety of manipulators 14 may be utilized in conjunction with the vacuum cup apparatus 10, such as robotic arms and/or transfer booms. The vacuum cup apparatus 10 has a flexible member 16 that engages the workpiece 12. A rigid coupling member 18 is connected to the flexible member 16 of the vacuum cup apparatus 10 and the manipulator 14. A vacuum source (not shown) communicates vacuum through a path 20 in the manipulator 14 to the vacuum cup apparatus 10.

Figure 2:
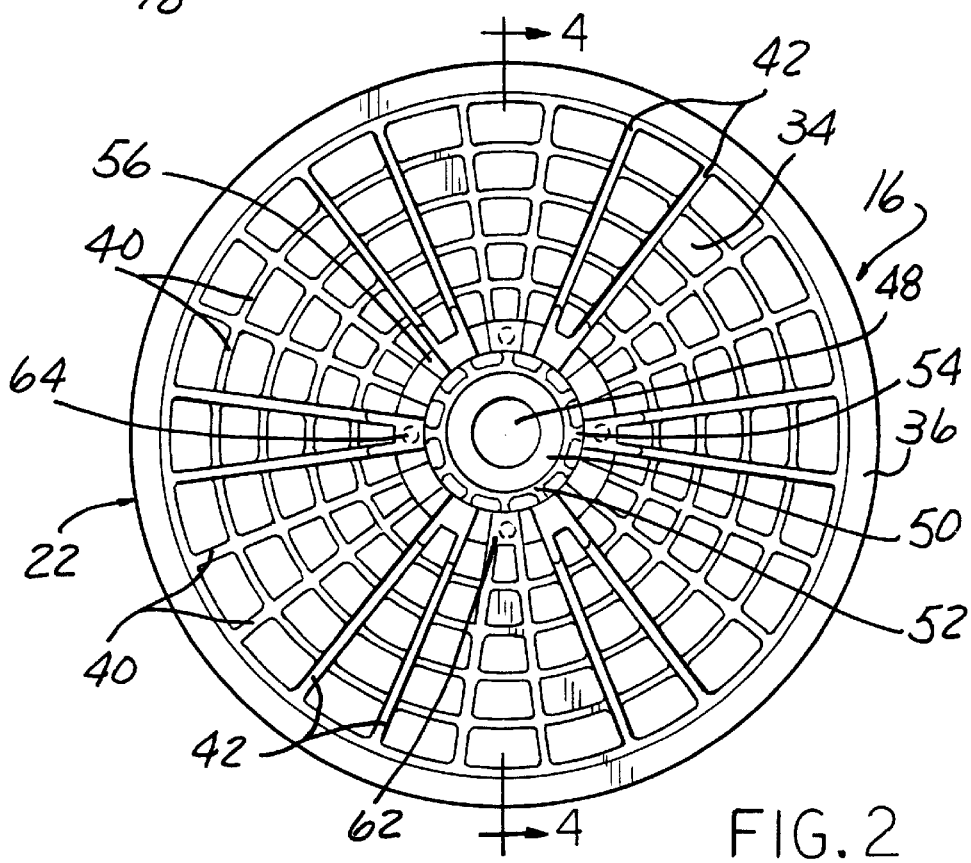
FIG. 2 is a front plan view of the flexible member of the present invention.

To ensure that engagement of the workpiece 12 by the vacuum cup apparatus 10 does not damage the workpiece 12, the flexible member 16 of the vacuum cup apparatus 10 is fabricated from a flexible sealable material such as rubber. As seen in FIGS. 1–2 and 4, the flexible member 16 provides a front side 22 for engaging the workpiece 12 and a back side 24 for supporting the rigid coupling member 18. Overall, the flexible member 16 has a frusto-conical shape with the front side 22 being substantially and relatively flat while the back side 24 rises gradually from the outer periphery of the flexible member 16 toward the center portion of the back side 24. A substantially cylindrical recess 26 is provided in the center of the back side 24 of the flexible member 16. Six ribs 28 are integrally formed in the back side 24 of the flexible member 16 to provide additional structural support to the flexible member 16. The ribs 28 extend from the outer periphery of the back side 24 of the flexible member 16 toward the portion of the back side 24 that defines the circular recess 26.

The substantially circular recess 26 on the back side 24 of the flexible member 16 is utilized to sealingly secure the rigid coupling member 18 to the flexible member 16. The circular recess 26 has a three stepped inner diameter wherein the deepest diameter 29 in the circular recess 26 is the largest diameter of the stepped inner diameter. The rigid coupling member 18 is cylindrical and fabricated from aluminum to reduce weight, but the rigid coupling member 18 may be fabricated from any rigid durable material such as steel, various metals, and durable plastics. The coupling member 18 has a stepped outer diameter that is complementary to the stepped inner diameters of the substantially circular recess 26. The bottom of the stepped outer diameter of the rigid coupling member 18 has a tapered edge 30 for ease of entry of the coupling member 18 into the substantially circular recess 26. A cap or top portion 32 of the rigid coupling member 18 extends over the top edge 33 of the back side 24 that defines the circular recess 26. A snug fit is provided between the flexible member 16 and the rigid coupling member 18 to form a seal between the flexible member 16 and the rigid coupling member 18.

To engage the workpiece 12, the front side 22 of the flexible member 16 provides a substantially flat circular surface 34 with a small outer peripheral surface 36 that extends downward at a small angle relative to the substantially flat surface 34. The flat surface 34 of the front side 22 extends radially outward at a slight downward angle from the centerline of longitudinal axis 38 of the apparatus 10 toward the outer peripheral surface 36 of the vacuum cup apparatus 10. The entire front side 22, as well as the flat surface 34, are coaxially aligned with the centerline or longitudinal axis 38 of the apparatus 10. The flat surface 34 of the front side 22 has a plurality of grooves 40 and slots 42 formed therein for directing oil and residue away from direct engagement between the flat surface 34 of the flexible member 16 and the workpiece 12. The grooves 40 comprise shallow troughs in the form of substantially concentric rings and radially extending rays. The slots 42 provide deeper indentations than the grooves 40 and extend radially outward in pairs. The pairs of slots 42 are circumferentially spaced about the flat surface 34 of the front side 22 of the flexible member 16.

To prevent vacuum from being applied to the center portion of the front side 22 of the flexible member 16, a cylindrical recessed pocket 48 is formed in the center of the front side 22 of the flexible member 16 and is coaxially aligned with the centerline axis 38 of the apparatus 10. The cylindrical portion of material defining the recessed pocket 48 has a downwardly extending lip 50 which engages the workpiece 12 and seals off the recessed pocket 48 from vacuum. A bottom side 52 of the portion defining the recessed pocket 48 has grooves 54 formed therein, similar to those provided on the flat surface 34 of the front side 22 of the flexible member 16, to direct any residue or oil away from the portions of the workpiece 12 that are engaged by the flexible member 16.

The recessed pocket 48 is suspended and supported within the center of the vacuum cup apparatus 10 by an integral webbing 56. The webbing 56 provides radially extending, circumferentially spaced segments 58 that extend between the flat surface 34 of the flexible member 16 and the sides 10 of the portion defining the recessed pocket 48. The radially extending segments 58 of the webbing 56 are recessed relative to the flat surface 34 of the front side 22 of the flexible member 16 and the bottom side 52 of the portion defining the recessed pocket 48.

To provide vacuum to the front side 22 of the flexible member 16, the spaces created between the radially extending segments 58 of the webbing 56 provide a passageway 62 extending from the front side 22 to the circular recess 26 in the back side 24 of the flexible member 16. As seen in FIGS. 1–4, the passageway 62 is placed in communication with four apertures 64 provided in the bottom surface 66 of the rigid coupling member 18 by aligning the apertures 64 with the spaces created between the segments 58 of the webbing 56. The four apertures 64 in the rigid coupling member 18 are in communication with a central aperture 68 that is coaxially aligned with the centerline axis of the apparatus 10. The four apertures 64 and central aperture 68 of the coupling member 18 provide a path between the passageway 62 and the vacuum source. The central aperture 68 is threaded to threadingly engage the manipulator 14 or transfer boom (not shown). The manipulator 14 communicates the vacuum source to the central aperture 68 which in turn communicates vacuum to the four apertures 64 in the rigid coupling member 18.

In operation, the manipulator 14 positions the vacuum cup apparatus 10 over the substantially flat workpiece 12. The outer peripheral surface 36 of the front side 22 of the flexible member 16 first engages the workpiece 12, followed by the lip 50 of the recessed pocket 48, and then by the substantially flat surface 34 of the front side 22 of the flexible member 16. Vacuum is applied by the vacuum source through the apertures 64 provided in the rigid coupling member 18 and through the passageway 62 provided in the flexible member 16. Any oils or residues between the workpiece 12 and the flat surface 34 of the front side 22 of the flexible member 16 flow into the grooves 40 and the slots 42 provided in the front side 22 of the flexible member 16 to provide strong retention and adhesion of the workpiece 12 to the front side 22 of the flexible member 16. The lip 50 of the recessed pocket 48 seals against the workpiece 12 and provides an area of atmospheric pressure within the recessed pocket 48. Thus, the center portion of the front side 22 of the flexible member 16 is without vacuum applied to the workpiece 12 thereby avoiding any tin cupping effect of the workpiece 12. The manipulator 14 lifts and moves the workpiece 12 to a designated area, as shown in FIG. 5. The vacuum source is terminated, and atmospheric pressure is allowed to enter the front side 22 of the flexible member 16. Upon atmospheric pressure being reestablished to the front side 22 of the flexible member 16, the workpiece 12 disengages from the front side 22 of the flexible member 16 of the vacuum cup apparatus 10.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vacuum cup apparatus comprising:
    a flexible member having a front side engageable with a workpiece and a back side connectable to a manipulator;
    a passageway extending from said front side to said back side of said flexible member and communicable with a vacuum source to provide vacuum to said front side of said flexible member;

a recessed pocket formed in said front side of said flexible member and having a lip defining an opening into said recessed pocket, and said lip engageable with said workpiece for isolating said recessed pocket from said vacuum source and maintaining atmospheric pressure within said recessed pocket when engaged with said workpiece; and said front side of said flexible member having a substantially flat surface and an annular gap between said recessed pocket and said flat surface.

2. The vacuum cup apparatus as stated in claim 1, wherein said front side of said flexible member further comprises:

an outer perimeter portion extending outwardly from and integrally with said flat surface.

3. The vacuum cup apparatus as stated in claim 1, further comprising:

said flat surface having a plurality of grooves formed therein.

4. The vacuum cup apparatus as stated in claim 1, further comprising:

said flat surface having a plurality of slots formed therein.

5. The vacuum cup apparatus as stated in claim 1, further comprising:

at least one structural rib integrally formed on said back side of said flexible member.

6. The vacuum cup apparatus as stated in claim 1, further comprising:

a coupling member connected to said back side of said flexible member and connectable to said manipulator; and said coupling member having a path in communication with said passageway and communicable with said vacuum source.

7. The vacuum cup apparatus as stated in claim 1, further comprising:

said recessed pocket having a longitudinal axis coaxially aligned with a longitudinal axis of said front side of said flexible member.

8. A vacuum cup apparatus comprising:

a flexible member having a front side engageable with a workpiece and a back side connectable to a manipulator;

a passageway extending from said front side to said back side of said flexible member and communicable with a vacuum source to provide vacuum to said front side of said flexible member;

a recessed pocket formed in said front side of said flexible member and having a lip defining an opening into said recessed pocket and said lip engageable with said workpiece for maintaining atmospheric pressure within said recessed pocket when engaged with said workpiece;

wherein said front side of said flexible member further comprises:
  a substantially flat surface; and
  an outer perimeter portion extending outwardly from and integrally with said flat surface; and a webbing extending between said recessed pocket and said flat surface of said front side of said flexible member wherein said webbing has at least one space formed therein for defining said passageway.

9. A vacuum cup apparatus comprising:

a flexible member having a front side engageable with a workpiece and a back side connectable to a manipulator;

a substantially flat surface formed on said front side of said flexible member;

a recessed pocket formed in said front side of said flexible member and having a lip defining an opening into said pocket, and said lip engageable with said workpiece for maintaining atmospheric pressure within said pocket when engaged with said workpiece;

a webbing extending between said pocket and said flat surface of said front side of said flexible member, and said webbing having at least one space formed therein; and a passageway defined by said at least one space in said webbing and extending from said front side to said back side of said flexible member and communicable with a vacuum source to provide vacuum to said front side of said flexible member.

10. The vacuum cup apparatus as stated in claim 9, further comprising:

an outer peripheral portion extending downwardly from and integrally with said flat surface of said front side of said flexible member.

11. The vacuum cup apparatus as stated in claim 9, further comprising:

said flat surface having a plurality of grooves and slots formed therein.

12. The vacuum cup apparatus as stated in claim 11, further comprising:

said slots recessed deeper in said front side of said flexible member than said grooves.

13. The vacuum cup apparatus as stated in claim 9, further comprising:

at least one structural rib integrally formed on said back side of said flexible member.

14. The vacuum cup apparatus as stated in claim 9, further comprising:

a rigid coupling member sealably connected to said back side of said flexible member;

said coupling member having a plurality of apertures in communication with a central aperture in said coupling member and in communication with said passageway; and said central aperture connectable to said manipulator and communicable with said vacuum source.

15. The vacuum apparatus as stated in claim 9, further comprising:

said recessed pocket having a longitudinal axis coaxially aligned with a longitudinal axis of said front side of said flexible member.

16. A vacuum cup apparatus comprising:

a flexible member having a front side engageable with a workpiece and a back side connectable to a manipulator;

a substantially circular flat surface formed on said front side of said flexible member;

an outer perimeter portion extending downwardly from and integrally with said flat surface of said front side of said flexible member away from said back side of said flexible member;

a recessed substantially circular pocket formed in said front side of said flexible member and having a lip defining an opening into said pocket and said lip engageable with said workpiece for maintaining atmospheric pressure within said pocket when engaged with said workpiece;

a webbing having a plurality of segments extending radially outward between said recessed pocket and said flat surface, and said segments circumferentially spaced to create a passageway extending from said front side to said back side of said flexible member; and a rigid coupling member sealedly connected to said back side of said flexible member and said coupling member having a plurality of apertures in communication with said passageway and in communication with a centrally located aperture in said coupling wherein said centrally located aperture is connectable to said manipulator and communicable with said vacuum source to provide a vacuum to said front side of said flexible member.

17. A vacuum cup apparatus as stated in claim 16, wherein said flat surface further comprises:

a plurality of circumferentially spaced, radially extending grooves and radially extending slots formed in said flat surface wherein said slots are formed deeper into said front side of said flexible member than said grooves.

18. A vacuum cup apparatus as stated in claim 16, further comprising:

a plurality of structural ribs integrally formed on said back side of said flexible member.

19. A vacuum cup apparatus as stated in claim 16, further comprising:

said recessed pocket having a longitudinal axis coaxially aligned with a longitudinal axis of said front side of said flexible member.

20. A vacuum cup apparatus as stated in claim 16, further comprising:

said back side of said flexible member having a cylindrical recess with a stepped inner diameter; and said coupling member having an outer stepped diameter complementary to said inner stepped diameter of said cylindrical recess to form a sealable connection between said flexible member and said coupling member.

21. A vacuum cup apparatus comprising:

a flexible member engageable with a workpiece;

a recessed pocket formed in said flexible member and having a lip defining an opening into said recessed pocket, and said lip engageable with said workpiece for maintaining atmospheric pressure within said recessed pocket when engaged with said workpiece;

a substantially flat surface formed in said flexible member; and a webbing extending between said recessed pocket and said substantially flat surface wherein said webbing has at least one space formed therein communicable with a vacuum source.

* * * * *